(12) United States Patent
Huang

(10) Patent No.: US 11,747,003 B2
(45) Date of Patent: Sep. 5, 2023

(54) ILLUMINATION DEVICE

(71) Applicant: Qisda Corporation, Taoyuan (TW)

(72) Inventor: Chih-Lung Huang, Taoyuan (TW)

(*) Notice: Subject to any disclaimer, the term of this patent is extended or adjusted under 35 U.S.C. 154(b) by 0 days.

(21) Appl. No.: 17/578,585

(22) Filed: Jan. 19, 2022

(65) Prior Publication Data
US 2022/0282858 A1 Sep. 8, 2022

(30) Foreign Application Priority Data
Mar. 2, 2021 (CN) .......................... 202110231213.5

(51) Int. Cl.
| | |
|---|---|
| *F21V 23/04* | (2006.01) |
| *H04N 7/18* | (2006.01) |
| *F21V 17/16* | (2006.01) |
| *F21V 21/14* | (2006.01) |
| *H04N 23/57* | (2023.01) |
| *H04N 23/695* | (2023.01) |

(52) U.S. Cl.
CPC .......... *F21V 23/0464* (2013.01); *F21V 17/16* (2013.01); *F21V 21/14* (2013.01); *H04N 7/183* (2013.01); *H04N 23/57* (2023.01); *H04N 23/695* (2023.01)

(58) Field of Classification Search
CPC ..... F21V 21/14; F21V 23/0464; G03B 15/05; H04N 23/56; H04N 23/695; H04N 23/611; H04N 23/74
See application file for complete search history.

(56) References Cited

U.S. PATENT DOCUMENTS

| | | | |
|---|---|---|---|
| 10,544,927 B2 | 1/2020 | Yen et al. | |
| 2015/0288860 A1* | 10/2015 | Chu | H04N 7/183 348/143 |
| 2017/0143442 A1* | 5/2017 | Tesar | A61B 90/37 |
| 2019/0289177 A1* | 9/2019 | Tseng | G03B 15/02 |
| 2020/0326773 A1* | 10/2020 | Bigioi | H04N 23/61 |
| 2021/0281730 A1* | 9/2021 | Hsu | G06V 40/13 |
| 2022/0146083 A1* | 5/2022 | Jiang | F21V 23/04 |

* cited by examiner

*Primary Examiner* — Kathleen V Nguyen

(57) ABSTRACT

An illumination device selectively disposed on an object having a first side and a second side is provided. The illumination device comprises a light-emitting module, a camera unit and a rotation mechanism. The lighting direction of the light-emitting module points towards the front of the first side. The central filming direction of the camera unit points towards the front of the first side. The light-emitting module is coupled to the rotation mechanism such that the light-emitting module is capable of rotating about an axis of the rotation mechanism. When the lighting direction falls in a first angular range relative to the axis of the rotation mechanism, the light-emitting module provides a first mode illumination. When the lighting direction falls in a second angular range relative to the axis of the rotation mechanism, the light-emitting module provides a second mode illumination. Said first angular range is different from said second angular range. When the light-emitting module provides the second mode illumination, the central filming direction falls in the second angular range.

19 Claims, 10 Drawing Sheets

ILLUMINATION DEVICE

BACKGROUND OF THE INVENTION

1. Field of the Invention

The present invention relates to an illumination device, specifically an illumination device whose illumination mode is adjustable according to the adjustment of the lighting direction.

2. Description of the Prior Art

During a video call, conference call, distance learning session, webcast, or audio-visual recording and the like, good lighting is often needed to beautify people or objects. On the other hand, when reading books, the brightness, color, color temperature or the other illumination qualities needed might be different from those used for lighting people.

Nowadays, many people read books and use computers on the same desk; therefore, an illumination device that satisfies the requirement for both lighting people and reading are urgently needed.

SUMMARY OF THE INVENTION

The present invention intends to provide an illumination device which can provide different illumination modes corresponding to different directions.

In order to achieve the aforementioned purpose, in an embodiment of the present invention, an illumination device may include a light-emitting module, a camera-unit, and a rotation mechanism, wherein the illumination device can be selectively disposed on an object. The object, for example, may be a display device, and may have a first side and a second side. The light-emitting module may have a lighting direction pointing towards the front of the first side. And the camera unit may have a central filming direction pointing towards the front of the first side. The light-emitting module may be coupled to the rotation mechanism and configured to rotate about an axis. When the lighting direction falls in a first angular range relative to the axis, the light-emitting module provides a first mode illumination. When the lighting direction falls in a second angular range which is relative to the axis and different from the first angular range, the light-emitting module provides a second mode illumination. The central firming direction of the camera unit falls in the second angular range which is relative to the axis.

In the aforementioned embodiment, since the light-emitting module provides the first mode illumination and the second mode illumination when the lighting direction falls in the first angular range and the second angular range, respectively, the illumination device can satisfy the different illumination requirements in the different angular ranges.

In order to achieve the aforementioned purpose, in another embodiment of the present invention, an illumination device may include a light-emitting module, a camera unit, and a rotation mechanism, wherein the illumination device can be selectively disposed on an object. The object may have a first side and a second side. The camera unit may have a central filming direction, wherein a first angle is included between the first side and the central filming direction. The light-emitting module can be coupled to the rotation mechanism and rotate about an axis. When the light-emitting module provides a first lighting direction, the light-emitting module provides a first mode illumination. A second angle is included between the first lighting direction and the first side. When the light-emitting module provides a second lighting direction, the light-emitting module provides a second mode illumination, a third angle is included between the second lighting direction and the first side. The second angle is smaller than the third angle, and the first angle is larger than the second angle.

In the aforementioned embodiment, the illumination device can provide illumination which satisfies the different requirements in the different directions since the light-emitting module provides the first mode illumination and the second mode illumination for the first lighting direction and the second lighting direction, respectively.

BRIEF DESCRIPTION OF THE DRAWINGS

Various embodiments of the present invention are described with reference to drawings. It should be noted that figures are not necessarily illustrated based on the actual proportions. The same element legends in the drawings mean the same elements/features.

DETAILED DESCRIPTION OF THE PREFERRED EMBODIMENT

Figure 1:
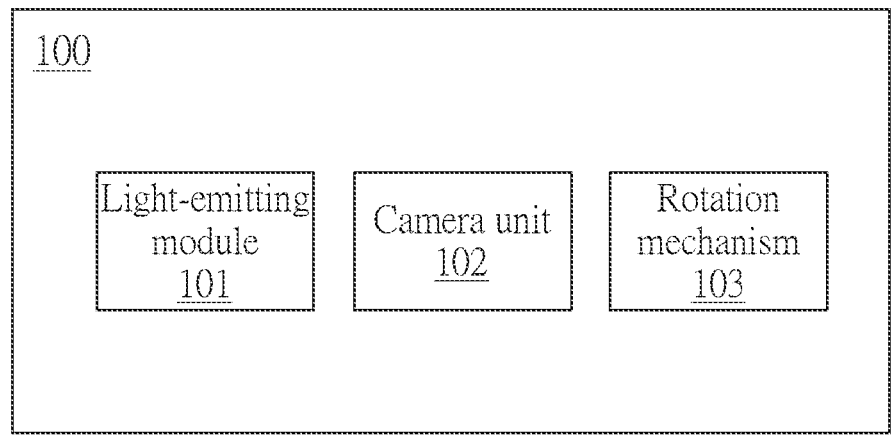
FIG. 1 illustrates a block-diagram of an illumination device according to some embodiments of the present invention.

Please refer to FIG. 1. an embodiment of the present invention, an illumination device 100 may include a light-emitting module 101, a camera unit 102, and a rotation mechanism 103. For example, the light-emitting module 101 may be a module configured to emit light such as an LED module, an OLED module, a PLED module, a mercury-vapor lamp module, a fluorescent lamp module, or a halogen lamp module. For example, the camera unit 102 may be a unit or a device capable of capturing image data such as a camera lens, a webcam, or a pinhole camera. For example, the rotation mechanism 103 may be a mechanism capable of rotating such as a gear, a connecting rod or a combination thereof. It should be noted that the aforementioned merely represent examples and do not intend to limit the scope of the present invention.

Figure 2:
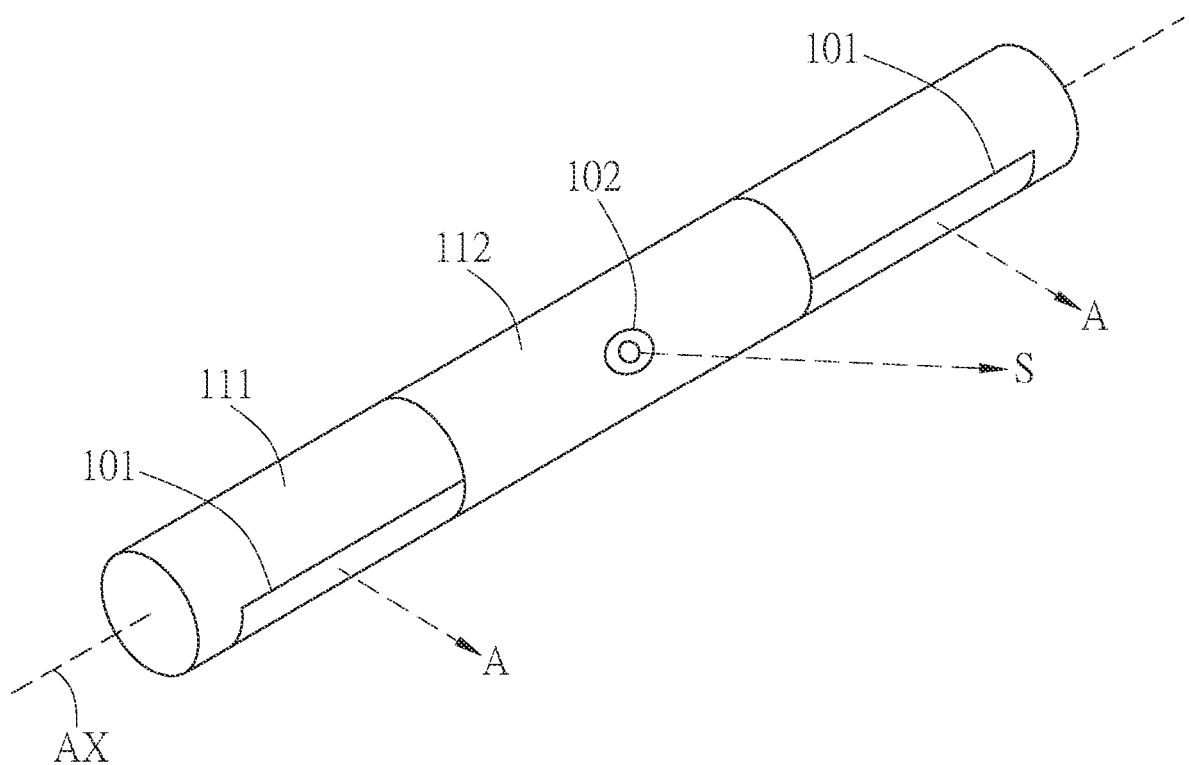
FIG. 2 illustrates a diagram of an illumination device according to some embodiments of the present invention.

The illumination device 100 may be selectively disposed on an object having two different sides. For example, in some embodiments, the illumination device 100 may be selectively disposed on an object such as a PC screen, the screen of a notebook PC, a tablet computer, a transformed tablet computer. Please refer to FIG. 2. According to some embodiments of the present invention, the light-emitting module 101 is disposed on a first elongated housing 111, and the camera unit 102 is disposed on a second elongated housing 112. As illustrated in FIG. 2, two elongated housings 111 are respectively disposed in direct or indirect connection to the two ends of the second elongated housing 112, extending in the same direction as the two ends in a fashion similar to collinearity. The light-emitting module 101 has a lighting direction A, and the camera unit 102 has a central filming direction S. In the present specification, the term "the lighting direction" may represent the direction in which the brightness distribution of the light emitted by the light-emitting module is highest, and the term "central filming direction" may represent the direction of the physical environment location corresponding to the center of the image data captured by the camera unit as seen from the camera unit.

Figure 3:
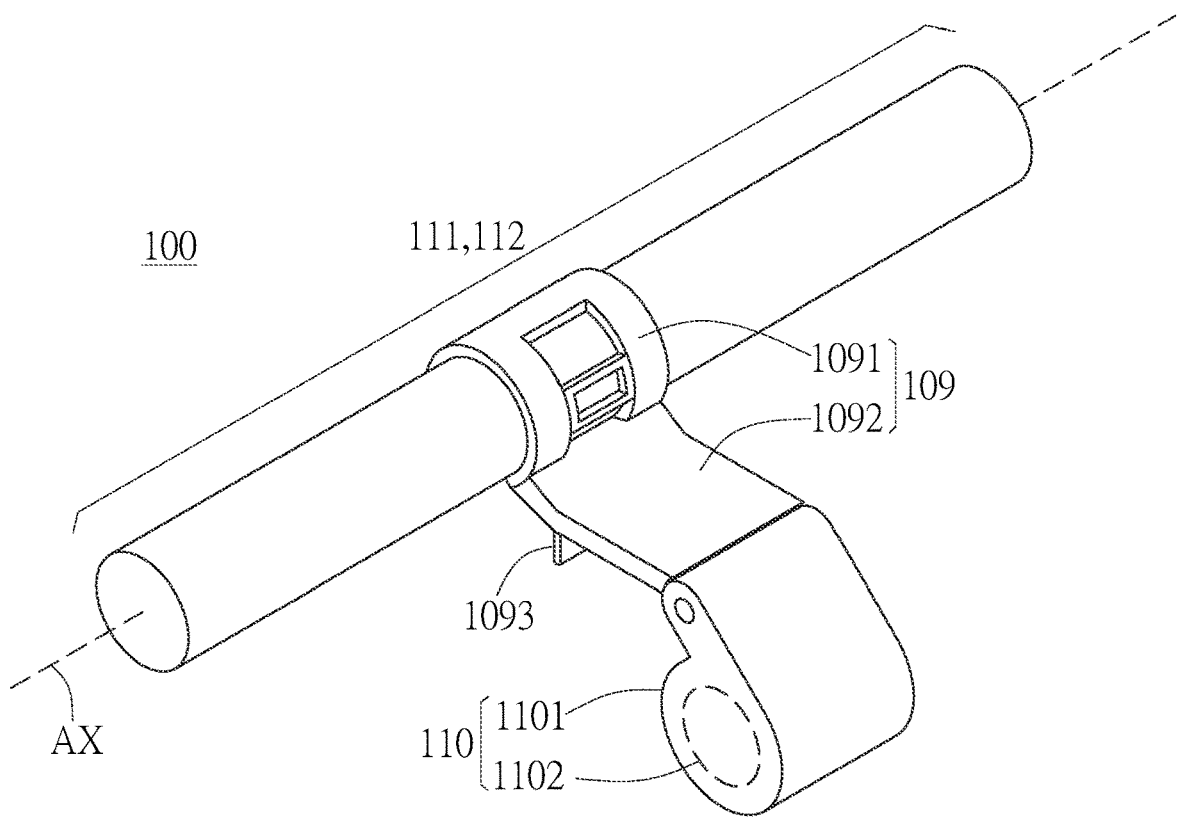
FIG. 3 illustrates a diagram of an illumination device according to some embodiments of the present invention.

Please refer to FIG. 1 and FIG. 3 together. Selectively, in some embodiments, in addition to the light-emitting module 101, the camera unit 102, and the rotation mechanism 103, the illumination device 100 further includes a first clip 109, a second clip 110, the first elongated housing 111 and the second elongated housing 112. The rotation mechanism 103 (such as a gear, a connecting rod or a combination thereof, not illustrated in FIG. 3) is disposed between the first elongated housing 111 and the second elongated housing 112. The light-emitting module 101 is disposed on the first elongated housing 111, and the camera unit 102 is disposed on the second elongated housing 112. According to some embodiments of the present invention, the rotation mechanism 103 is disposed between the first elongated housing 111 and the second elongated housing 112, and it may be, for example, a shaft, a hole sleeve, a gear, or a combination thereof. The light-emitting module 101 is coupled to the rotation mechanism 103 so as to be capable of rotating about an axis AX. In other words, the light-emitting module 101 may rotate with the axis AX as the center. The first elongated housing 111 and the second elongated housing 112 may be coaxial to rotate with respect to the axis AX; that is, both the first elongated housing 111 and the second elongated housing 112 may rotate relatively or commonly with the axis AX as the center. In the present specification, the term "coupling" may represent a direct or indirect physical connection or a direct or indirect electrical connection.

As illustrated in FIG. 3, according to some embodiments of the present invention, the first clip 109 has a connecting portion 1091 and a first clamping portion 1092, wherein the second elongated housing 112 is connected to the connecting portion 1091. In the present embodiment, the connecting portion 1091 is in the form of a cannula or a collar. The second elongated housing 112 extends into the cannula or the collar so as to be connected to the connecting portion 1091. However, in different embodiments, for example, the connecting portion 1091 may also be in the form of a ring piece sandwiched between the first elongated housing 111 and the second elongated housing 112, and not limited to the aforementioned embodiments. The second clip 110 has a second clamping portion 1101 and a counterweight 1102 disposed on the second clamping portion 1101. The first clamping portion 109 and the second clamping portion 1101 are movably connected to each other. In the present embodiment, the first clamping portion 109 and the second clamping portion 1101 are both of a plate shape. And the ends of them may be connected by a hinge. Therefore, the second clamping portion 1101 may swing with respect to the first clamping portion 109 so as to change the angle included between them.

Figure 4:
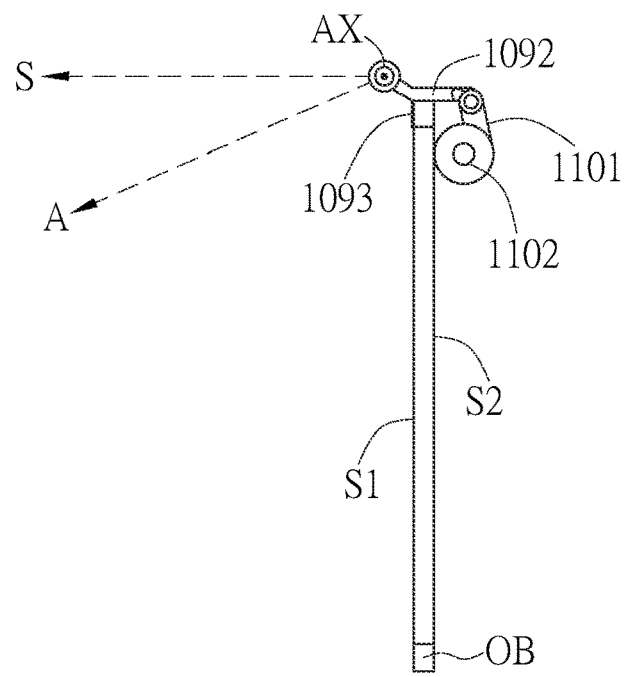
FIG. 4 illustrates a diagram of an illumination device disposed on an object according to some embodiments of the present invention.

Please refer to FIG. 4, when the illumination device 100 is installed on an object OB having a first side S1 and a second side S2, the first clamping portion 109 is supported by the top end of the object OB, and a baffle 1093 of the first clamping portion 109 extending downward can be in contact with the first side S1, and the second clamping portion 1101 can extend to the second side S2 of the object OB. With the help of the torque generated by the counterweight 1102 and the first clamping portion 109, the stability of the illumination device 100 on the object OB can be increased. The object OB, for example, may be a display monitor; the first side S1 thereof may be the side of the display screen, and the second side S2 may be the back surface. As illustrated in FIG. 4, a lighting direction A may point towards the front of the first side S1, and a central filming direction S may point towards the front of the first side S1. However, the lighting direction A and the central filming direction S may be different directions. It should be noted that the lighting direction A and the central filming direction S illustrated in FIG. 4 merely represent examples and the present invention is not limited thereto.

Figure 5:
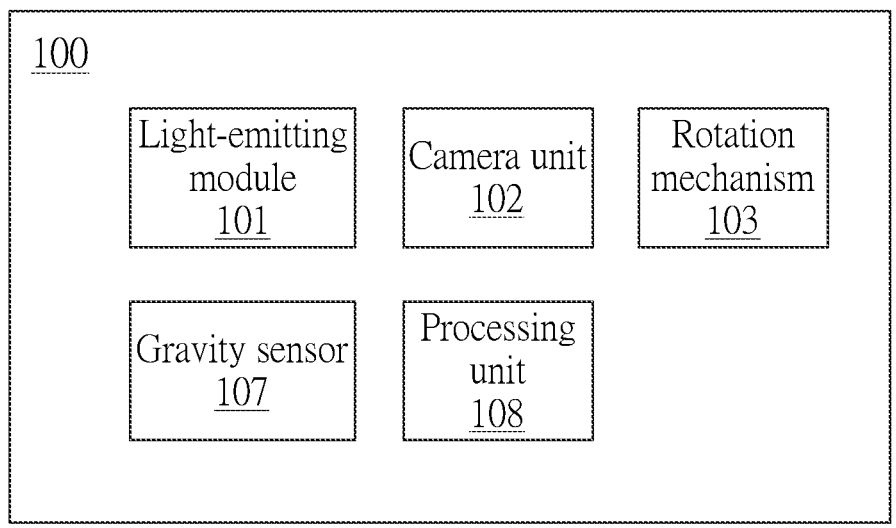
FIG. 5 illustrates a block-diagram of an illumination device according to some embodiments of the present invention.
Figure 6:
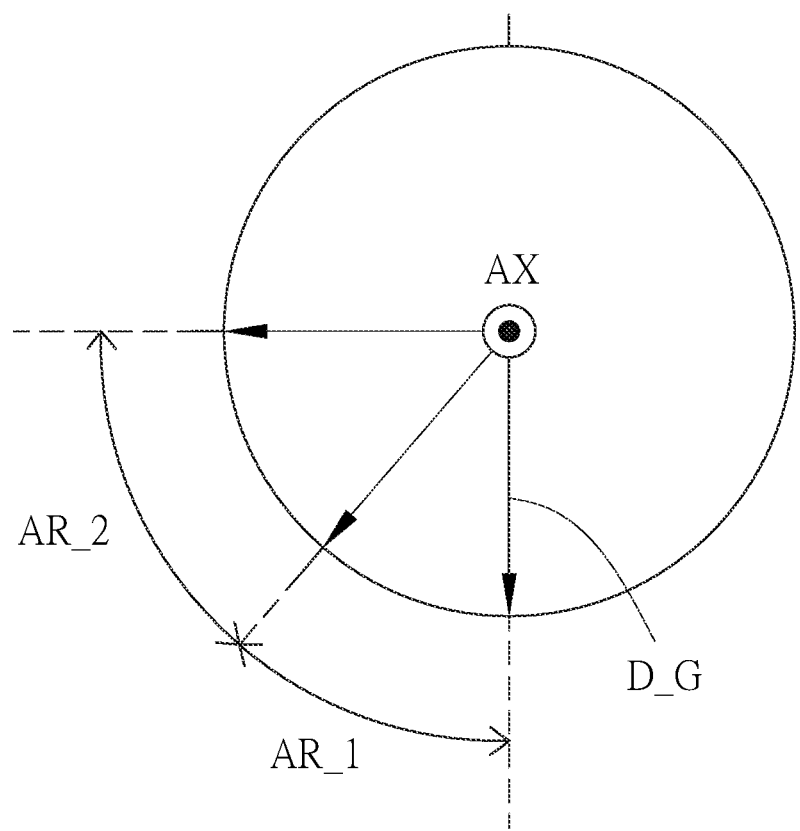
FIG. 6 illustrates a diagram of angular ranges according to some embodiments of the present invention.

Please refer to FIG. 5 and FIG. 6 together. According to some embodiments of the present invention, the illumination device 100 may optionally include a gravity sensor 107 and a processing unit. The gravity sensor 107 is configured to detect a gravity direction D_G. The processing unit 108 is configured to determine which angular range the lighting direction of the light-emitting module 101 falls into according to the gravity direction D_G. As illustrated in FIG. 6, a few angular ranges and directions may be defined or determined relative to the axis AX. The lighting direction of the light-emitting module 101 may also be determined relative to the axis AX and the gravity direction D_G. In the present embodiment, a first angular range AR_1 and a second angular range AR_2 can be defined relative to the axis AX and the gravity direction D_G. As illustrated in FIG. 6, the first angular range AR_1 is the range in which the angle included between the gravity direction D_G is smaller than or equals to 30 degrees; the second angular range AR_2 is the range in which the angle included between the gravity direction D_G ranges from 30 to 90; however, the present invention is not limited thereto. In addition, it should be noted that those illustrated in FIG. 6 merely represent examples and do not intend to limit the present invention to any angles or angular ranges recited in the claims of the present invention.

Figure 7A:
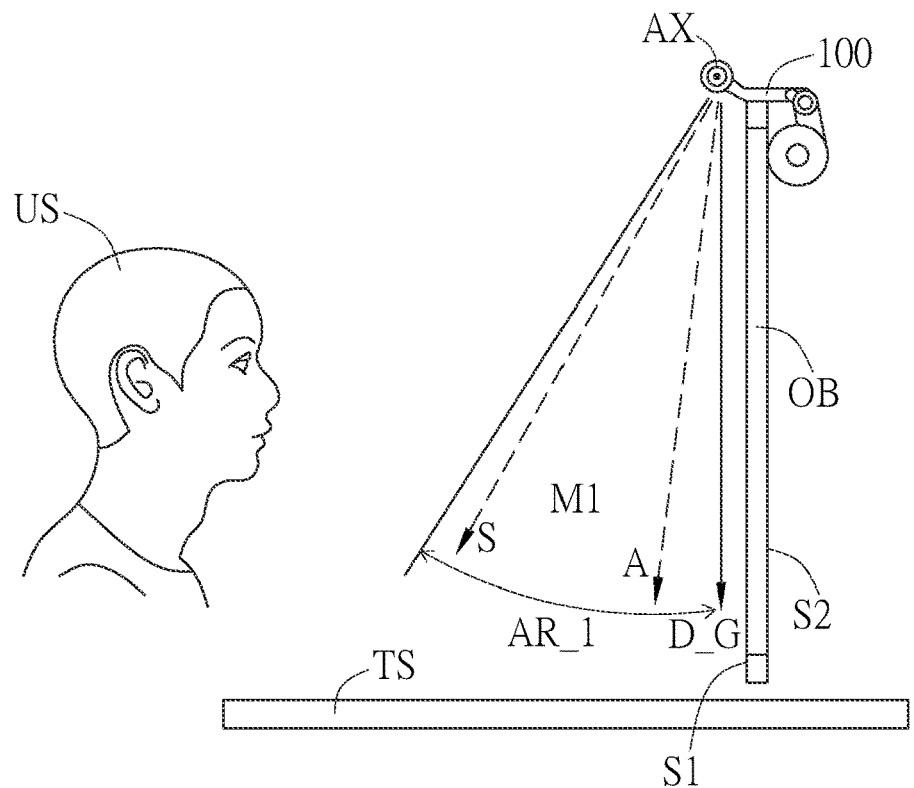
FIG. 7A and FIG. 7B illustrate diagrams of usage according to some embodiments of the present invention.

Please refer to FIG. 7A, according to some embodiments of the present invention, when the lighting direction A of the light-emitting module 101 falls in the first angular range AR_1, the light-emitting module 101 provides a first mode illumination M1. In that case, the central filming direction S may also fall in the first angular range AR_1. In some embodiments, when the illumination device 100 provides the first mode illumination M1, the illumination is provided to a table surface TS on which the object OB is disposed, for example, when a light source required for reading is provided. Therefore, when the light-emitting module 101 is rototated in a first angular range AR_1 relative to an axis AX, the light-emitting module 101 provides illumination to the table surface TS. Please further refer to FIG. 7B. When the lighting direction A of the light-emitting module 101 and the central filming direction S fall in the second angular range AR_2, the light-emitting module 101 provides a second mode illumination M2. In some embodiments, when the illumination device 100 provides the second mode illumination M2 with supplement illumination for the camera unit 102, the supplement illumination is provided to the face of a user US. That is, when the light-emitting module 101 is rototated in a second angular range AR_2 relative to the axis AX, the light-emitting module 101 provides supplement illumination for the camera unit 102. The first mode illumination M1 and the second mode illumination M2 may originally have or may be set to have different light source settings of different qualities such as color temperatures, chromaticity, intensity, uniformity, and light exiting angles, respectively, so as to satisfy different illumination demands.

Figure 7B:
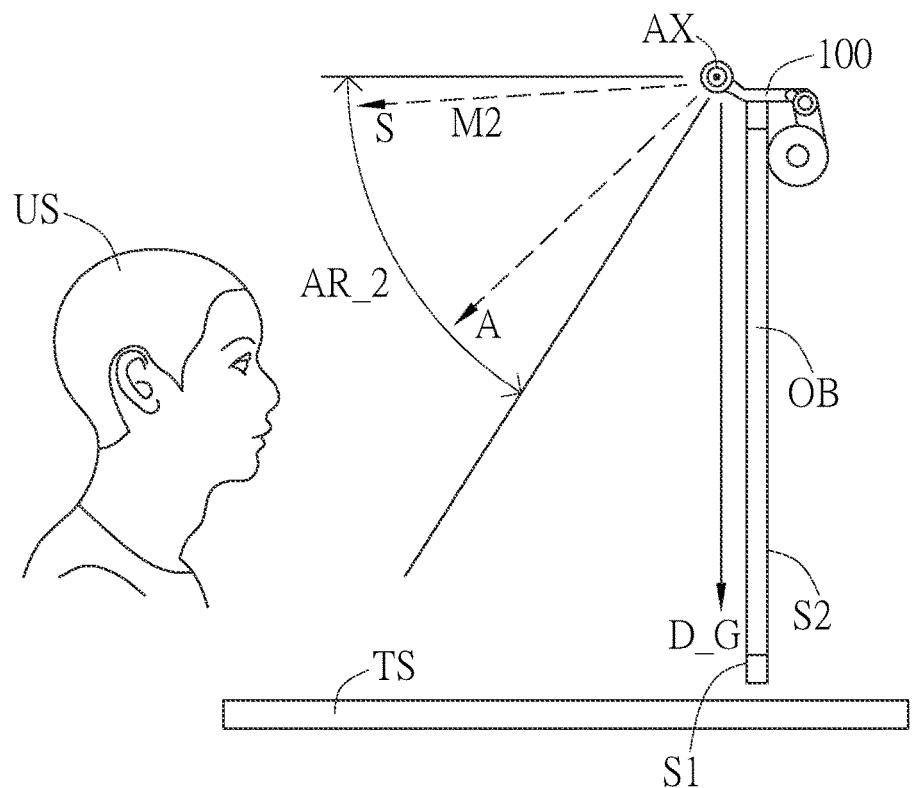

As illustrated in FIG. 7A and FIG. 7B, it is known that the first side S1 of the object OB is approximately parallel to the gravity direction D_G; however, the present invention is not limited thereto.

As illustrated in FIG. 6 to FIG. 7B, the first angular range AR_1 is different from the second angular range AR_2 and when the lighting direction A falls in the first angular range AR_1 relative to the axis AX, the central filming direction S may be out of the second angular range AR_2; therefore, the illumination device 100 can provide the illumination satisfying different demands for the different lighting angular ranges. In some embodiments, the illumination device of the present invention may satisfy the demands of lighting people and reading at the same time.

Figure 8A:
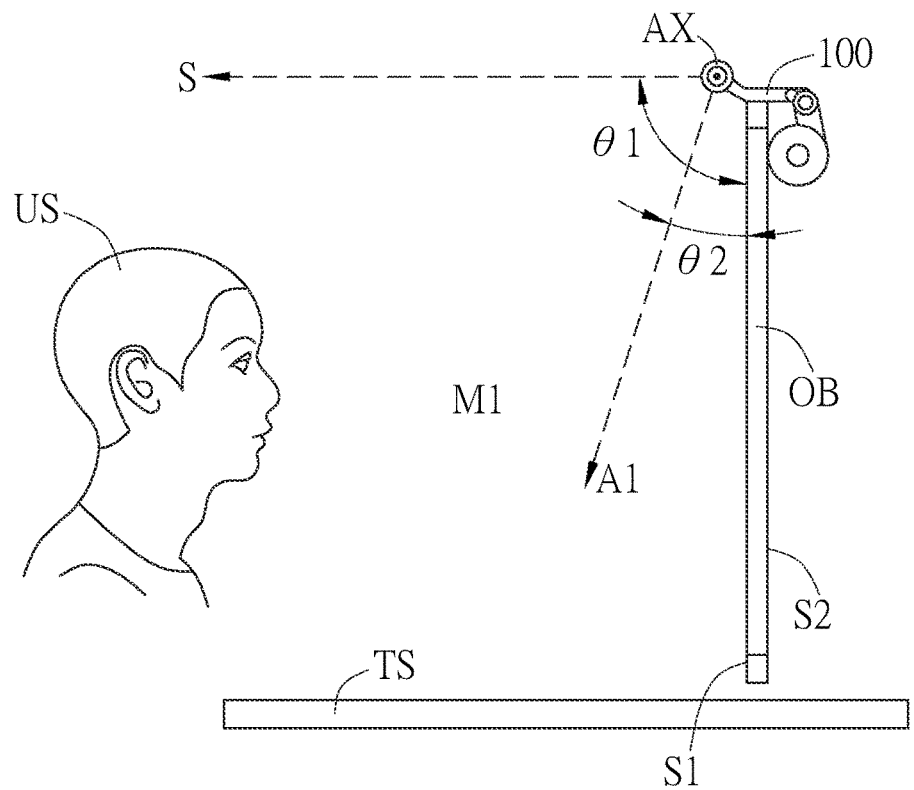
FIG. 8A and FIG. 8B illustrate diagrams of usage according to different embodiments of the present invention.
Figure 8B:
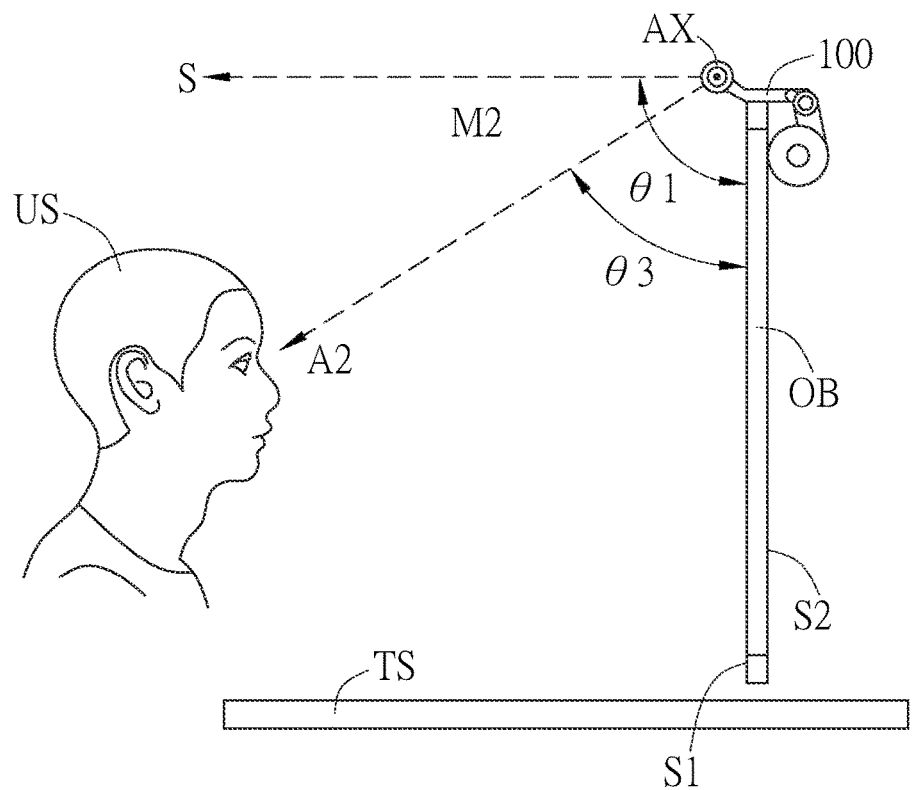
Figure 9:
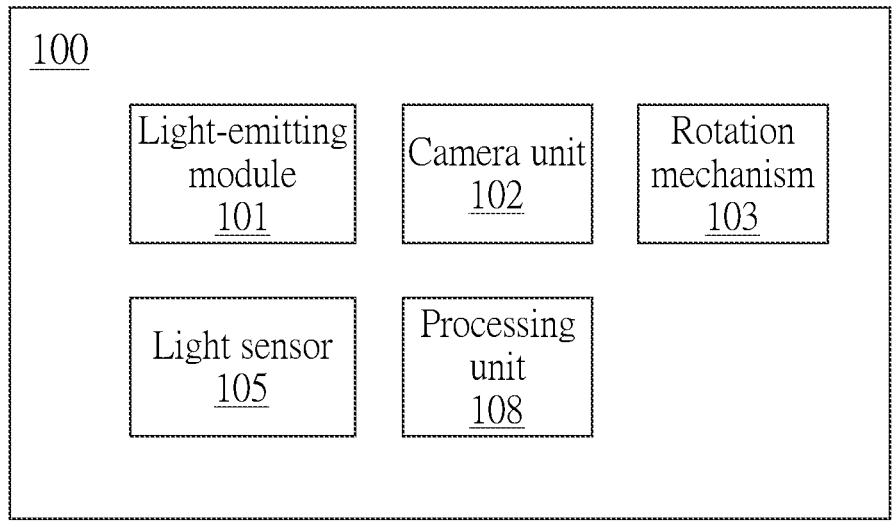
FIG. 9 and FIG. 10 illustrate block-diagrams of an illumination device according to some embodiments of the present invention.

In a different embodiment illustrated in FIG. 8A and FIG. 8B, a first angle θ1 is included between the first side S1 and the central filming direction S. In the present embodiment, the central filming direction S is approximately parallel to the table surface TS and the first angle θ1 is approximately a right angle; however, the present invention is not limited thereto. The light-emitting module 101 may also be configured to provide a first mode illumination M1 when the second angle θ2 included between the first lighting direction A1 and the first side S1 of the object OB (such as the display surface of the display device) is small, and to provide a second mode illumination M2 when the third angle θ3 included between the second lighting direction A2 and the object OB is large. Therefore, in the present embodiment, the second angle θ2 is smaller than the third angle θ3 and the first angle θ1 larger than the second angle θ2.

Figure 10:
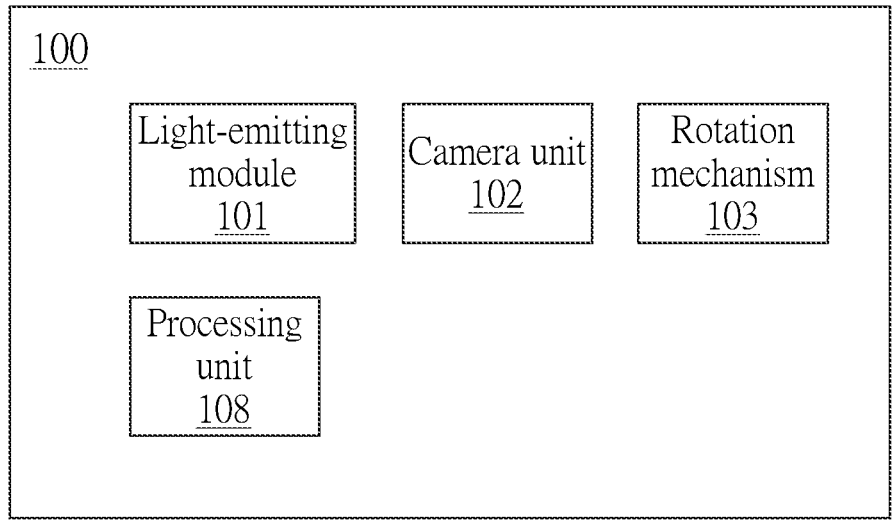

Please refer to FIG. 7A to FIG. 9. According to some embodiments of the present invention, the illumination device 100 may optionally include a light sensor 105 and the processing unit 108. When the light-emitting module 101 provides the first mode illumination M1, the light sensor 105 may detect the ambient light intensity around the table surface TS on which the object OB is disposed, and the processing unit 108 may adjust the brightness and/or color temperature of the first mode illumination M1 in accordance with the ambient light intensity detected by the light sensor 105. For example, along with the increase of the ambient light intensity around the table, brightness and/or color temperature of the first mode illumination M1 may be decreased to provide the light source suitable for reading. In addition, please refer to FIG. 7B and FIG. 10. According to some embodiments of the present invention, when the light-emitting module 101 provides the second mode illumination M2 and the camera unit 102 captures image data, the processing unit 108 may adjust the brightness and/or color temperature of the second illumination module M2 according to the image data captured by the camera unit 102. For example, the brightness and/or color temperature of the second mode illumination M2 may be adjusted according to the different demands for lighting faces.

Figure 11:
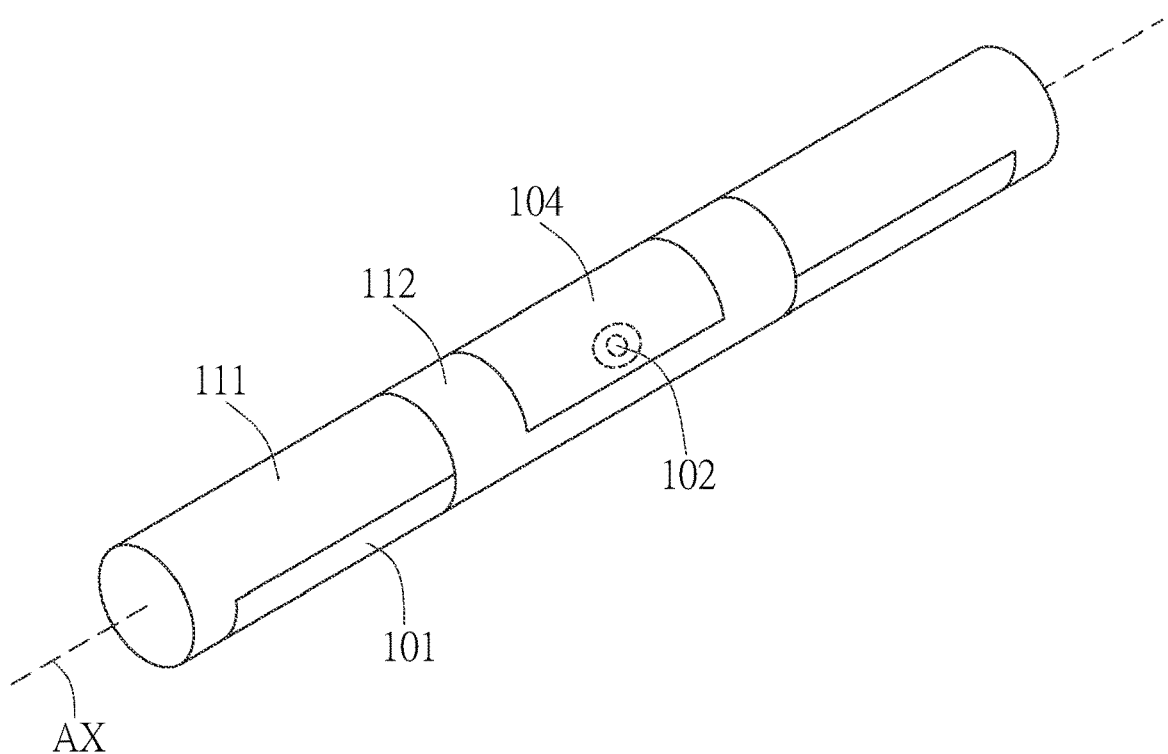
FIG. 11 and FIG. 12 illustrate diagrams of an illumination device according to some embodiments of the present invention.
Figure 12:
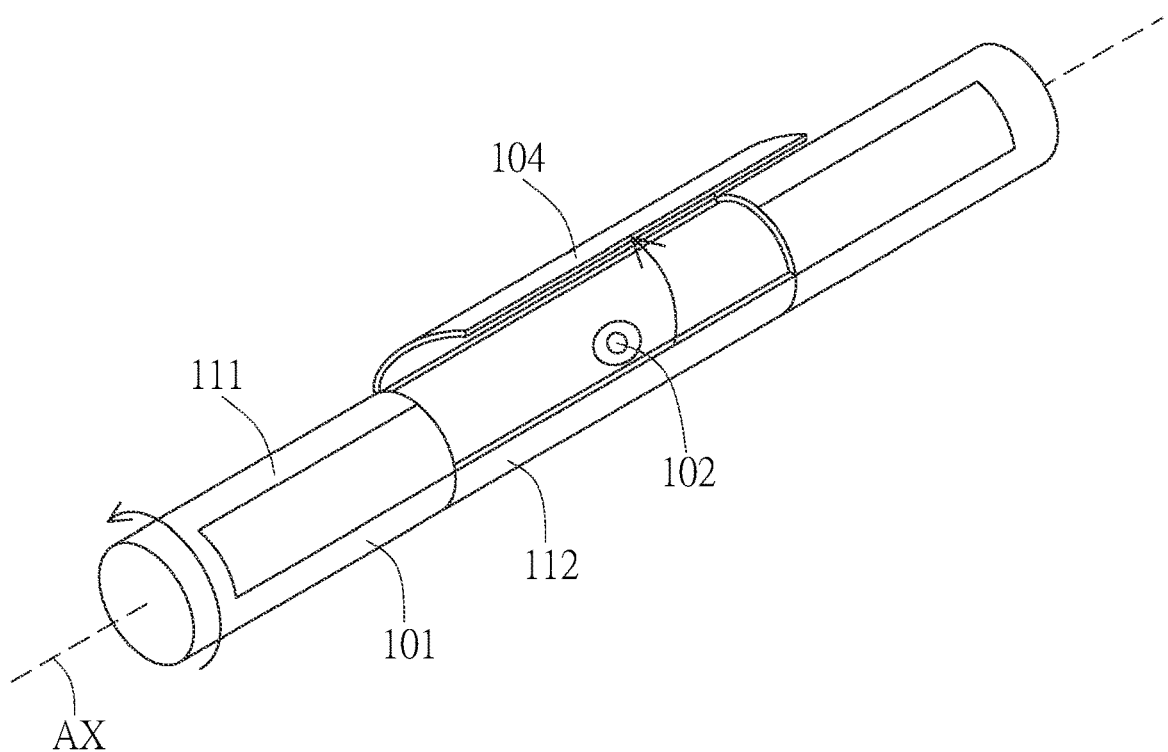

Please refer to FIG. 11. In some embodiments of the present invention, the illumination device may further optionally include a cover 104. For example, in the embodiment in which the camera unit 102 is a webcam connected to a computer, in order to prevent computer hackers from invading privacy, the user may cover the camera unit 102 using the cover 104 when the camera unit 102 is not used. In an embodiment, the user can manually open or close the cover 104 so as to determine whether or not to cover the camera unit 102. However, according to some embodiments of the present invention, the cover 104 may also be coupled to the rotation mechanism 103 by a gear, a connecting rod, or similar mechanisms; therefore, the cover 104 may move according to the rotation of the light-emitting module 101. For example, when the first mode illumination M1 is provided along with the rotation of the light-emitting module 101, illumination is provided to the user US for reading. In that case, the cover 104 may cover the camera unit 102; therefore, the camera unit 102 is not able to capture the image data of the user US. Please further refer to FIG. 12. Since the cover 104 may move according to the rotation of the light-emitting module 101, when illumination is provided to the user for lighting the face thereof along with the rotation of the light-emitting module 101, the cover 104 may also be rotated so that the camera unit 102 is not covered, which allows the camera unit 102 to capture the image data of the user.

In another embodiment, a cover 104 may be formed to extend from the first elongated housing 111 to the location of the second elongated housing 112. When the light-emitting module 101 on the first elongated housing 111 is rotated, the cover 104 will be driven to rotate together. For example, when the light-emitting module 101 is rotated to illuminate a table, the cover 104 will be driven to rotate to cover the camera unit 102. And when the light-emitting module 101 is rotated to illuminate the user, the cover 104 will be driven to rotate so as not to cover the camera unit 102.

According to some embodiments of the present invention, the camera unit 102 is coupled to the rotation mechanism 103 so as to be capable of rotating about the axis AX. When the light-emitting module 101 is rotated, the camera unit 102 may be driven to rotate together. For example, when the light-emitting module 101 provides the second mode illumination to the user for lighting the face thereof, the lighting direction of the light-emitting module 101 and the central filming direction of the camera unit 102 may point towards the face of the user together. And when the light-emitting module 101 is rotated and switched to provide the first mode illumination to the user for reading, the camera unit 102 may be rotated at the same time (may be in the same direction or the opposite direction) so that the central filming direction is away from the face of the user US.

Figure 13:
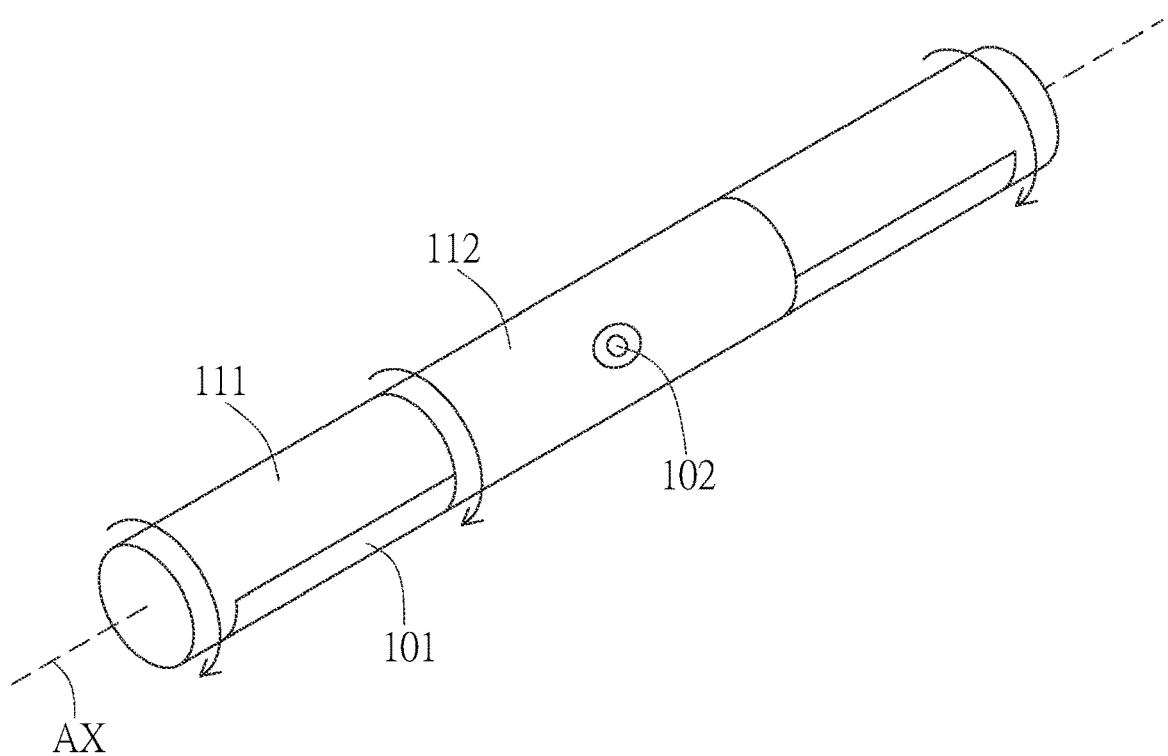
FIG. 13 and FIG. 14 illustrate operation diagrams according to some embodiment of the present invention.
Figure 14:
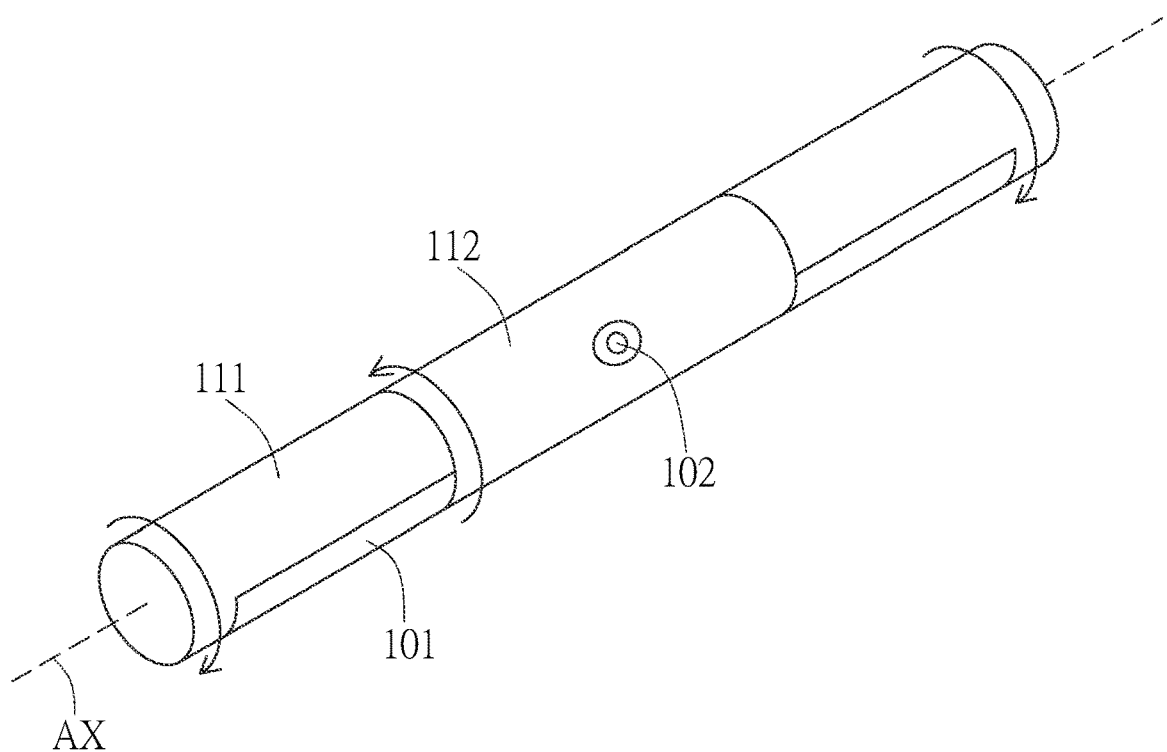
Figure 15:
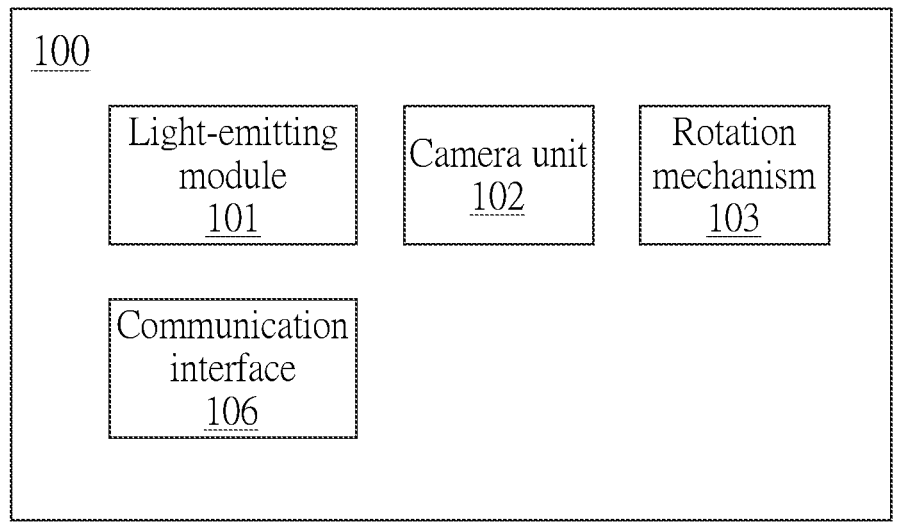
FIG. 15 illustrates a block-diagram of an illumination device according to some embodiments of the present invention.

In an embodiment, as illustrated in FIG. 13, the light-emitting module 101 and the camera unit 102 are assembled together using a forward gear; that is, when the light-emitting module 101 is rotated, the camera unit 102 will be driven to rotate in the same direction, so that the lighting range and the image capturing range can be adjusted synchronously. However, in a different embodiment, as illustrated in FIG. 14, the light-emitting module 101 and the camera unit 102 may also be assembled together using a reversing gear; that is, when the light-emitting module 101 is rotated, the camera unit 102 will be driven to rotate in the opposite direction; therefore, it is possible to configure it so that the lighting range and the image capturing range are intersected with each other in the second angular range AR_2. And when the light-emitting module is rotated downwards and towards the table suface TS (such as when in the first angular range AR_1), the camera unit 102 is rotated upwards and towards the ceiling so as not to capture the image data of the user.

As illustrated in FIG. 1, according to some embodiments of the present invention, the illumination device 100 may optionally include a communication interface 106. The communication interface 106 may be connected with the camera unit 102. When the camera unit 102 captures image data, and the light-emitting module 101 provides the second mode illumination (such as when lighting a face), the camera unit 102 may transmit the image data captured by the camera unit 102 through the communication interface 106. For example, when the user US lights the face using the second mode illumination, the image data captured by the camera unit 102 may be transmitted to the computer through the communication interface 106 for the user to conduct a video conference. In addition, when the light-emitting module 101 provides the first mode illumination (for example, providing the user lighting for reading and not for lighting the face), the camera unit 102 can be switched off or the communication interface can stop transmitting the image data captured by the camera unit.

Figure 16:
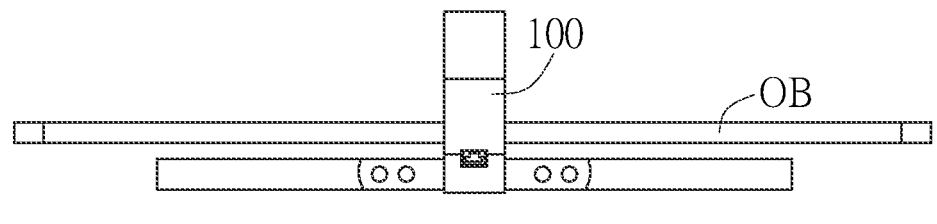
FIG. 16 to FIG. 18 illustrate diagrams of usage according to some embodiments of the present invention.
Figure 16:
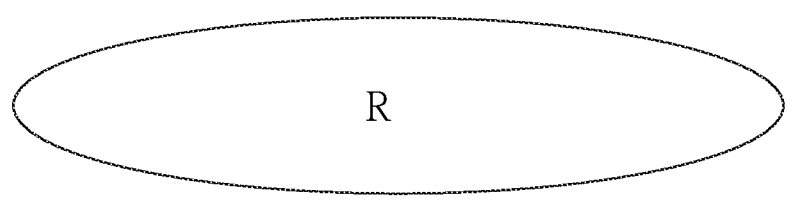
Figure 16:
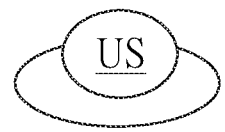
Figure 17:
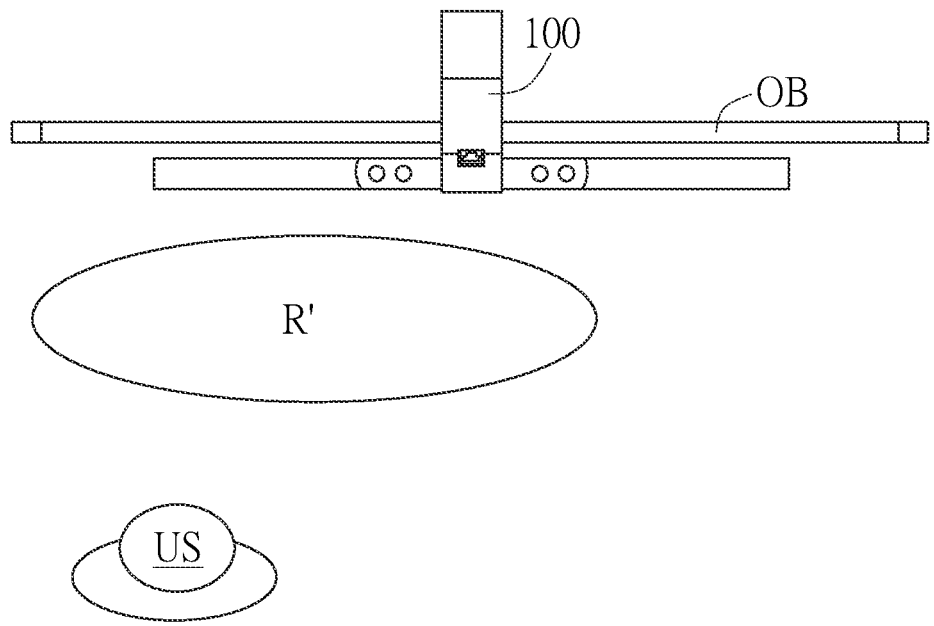
Figure 18:
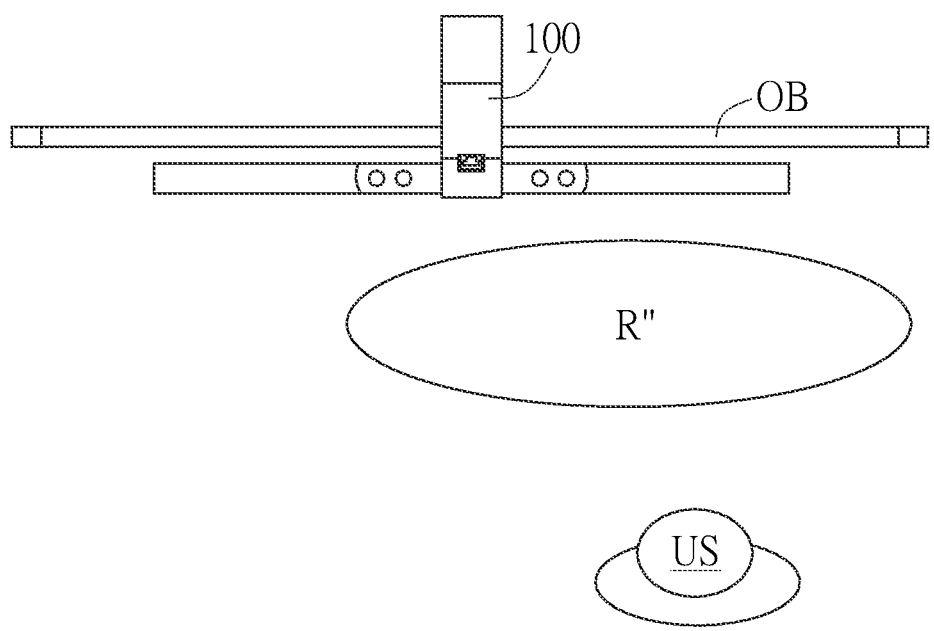

Please refer to FIG. 16 to FIG. 18 at the same time. According to some embodiments of the present invention, when the light-emitting module 101 provides the first mode illumination (such as providing the user US lighting for reading), and the camera unit 102 captures the image data, the processing unit 108 may adjust the lighting condition of the light-emitting module 101 according to the location of the user US in the image data captured by the camera unit 102. For example, as illustrated in FIG. 16, when the user US is located right in front of the illumination device 100, the light-emitting module 101 may emit full light to provide the illumination area R. As illustrated in FIG. 17 and FIG. 18, when the location of the user US is not right in front of the illumination device 100, the light-emitting module 101 may emit light only for the portion close to the user so as to provide the illumination area R' or R".

It should be noted that the embodiments disclosed in the specification is merely used for description without any intention to limit the scope of the present invention.

The aforementioned description discloses the preferred embodiment of the present disclosure, and various modification can be easily accomplished by people skilled in the art. Without departing from the conception principles of the present invention, people skilled in the present art may realize the present disclosure through other embodiments based on different views and applications without any intention to limit the scope of the present disclosure. Therefore, the aforementioned embodiments do not intent to limit the scope of the present invention.

What is claimed is:

1. An illumination device selectively disposed on an object having a first side and a second side, the illumination device comprising:
    a light-emitting module having a lighting direction casting towards a front of the first side;
    a camera unit having a central filming direction pointing towards the front of the first side; and
    a rotation mechanism being coupled to the light-emitting module so that the light-emitting module is capable of rotating about an axis;
    a first elongated housing, wherein the light-emitting module is disposed on the first elongated housing; and
    a second elongated housing, wherein the camera unit is disposed on the second elongated housing, wherein the rotation mechanism is disposed between the first elongated housing and the second elongated housing, wherein the first elongated housing and the second elongated housing are coaxial to rotate about the axis,
    wherein the light-emitting module is configured to provide a first mode illumination when the lighting direction falls in a first angular range relative to the axis, and
    wherein the light-emitting module is configured to provide a second mode illumination when the lighting direction falls in a second angular range relative to the axis and the central filming direction is located in the second angular range, the second angular range is different from the first angular range.

2. The illumination device of claim 1, further comprising a cover, wherein the cover covers the camera unit when the light-emitting module provides the first mode illumination, and the camera unit is not blocked by the cover when the light-emitting module provides the second mode illumination.

3. The illumination device of claim 1, further comprising:
    a light sensor; and
    a processing unit,
    wherein the light sensor is configured to detect an ambient light intensity of a space corresponding to the lighting direction when the light-emitting module provides the first mode illumination, and
    wherein the processing unit is configured to adjust brightness and/or color temperature of the first mode illumination in accordance with the ambient light intensity.

4. The illumination device of claim 1, further comprising:
    a communication interface connected to the camera unit, wherein when the light-emitting module provides the second mode illumination, the camera unit captures image data and transmits the image data through the communication interface; and wherein when the light-emitting module provides the first mode illumination, the camera unit is switched off.

5. The illumination device of claim 1, wherein the camera unit is coupled to the rotation mechanism so that the camera unit is capable of rotating about the axis, and wherein the camera unit is driven to rotate when the light-emitting module rotates, wherein when the lighting direction falls in the first angular range relative to the axis, the central filming direction is out of the second angular range.

6. The illumination device of claim 1, further comprising a processing unit, wherein the processing unit is configured to adjust brightness and/or color temperature of the second mode illumination in accordance with image data captured by the camera unit when the light-emitting module provides the second mode illumination.

7. The illumination device of claim 1, wherein when the light-emitting module provides the second mode illumination and the camera unit captures image data, a light-emitting portion of the light-emitting module is configured to be adjusted in accordance with a location of a user in the image data.

8. The illumination device of claim 1, further comprising:
a gravity sensor configured to detect a gravity direction; and
a processing unit configured to determine the lighting direction falls in the first angular range or the second angular range in accordance with the gravity direction.

9. The illumination device of claim 1, further comprising:
a first clip having a first clamping portion and a connecting portion, the second elongated housing being connected to the connecting portion; and
a second clip having a second clamping portion and a counterweight disposed on the second clamping portion, wherein the first clamping portion and the second clamping portion are moveably connected to each other, and wherein the first clamping portion is in contact with the first side and the second clamping portion is in contact with the second side when the illumination device is disposed over the object.

10. An illumination device selectively disposed on a monitor standing on a surface, the monitor having a first side and a second side, the illumination device comprising:
a first clip being in contact with the first side;
a second clip movably connecting to the first clip, the second clip being in contact with the second side;
a light-emitting module set on the first clip, the light-emitting module having a lighting direction casting towards a front of the first side;
a camera unit having a central filming direction pointing towards the front of the first side; and
a rotation mechanism being coupled to the light-emitting module,
wherein when the light-emitting module is rotated in a first angular range relative to an axis, the light-emitting module provides illumination to the surface,
wherein when the light-emitting module is rotated in a second angular range relative to the axis, the light-emitting module provides supplement illumination for the camera unit and the central filming direction is located in the second angular range, the second angular range is different from the first angular range.

11. The illumination device of claim 10, further comprising a cover, wherein the cover covers the camera unit when the light-emitting module is rotated in the first angular range relative to an axis, and the camera unit is not blocked by the cover when the light-emitting module is rotated in the second angular range relative to the axis.

12. The illumination device of claim 10, further comprising:
a light sensor; and
a processing unit,
wherein the light sensor is configured to detect an ambient light intensity of a space corresponding to the lighting direction when the light-emitting module is rotated in the first angular range relative to an axis, and
wherein the processing unit is configured to adjust brightness and/or color temperature in accordance with the ambient light intensity when the light-emitting module is rotated in the first angular range relative to an axis.

13. The illumination device of claim 10, further comprising:
a communication interface connected to the camera unit, wherein when the light-emitting module is rotated in the second angular range relative to the axis, the camera unit captures image data and transmits the image data through the communication interface.

14. The illumination device of claim 10, wherein the camera unit is coupled to the rotation mechanism so that the camera unit is capable of rotating about the axis, and wherein the camera unit is driven to rotate when the light-emitting module rotates, wherein when the lighting direction falls in the first angular range relative to the axis, the central filming direction is out of the second angular range.

15. The illumination device of claim 10, further comprising a processing unit, wherein the processing unit is configured to adjust brightness and/or color temperature in accordance with image data captured by the camera unit when the light-emitting module is rotated in the second angular range relative to the axis.

16. The illumination device of claim 10, wherein when the light-emitting module is rotated in the second angular range relative to the axis and the camera unit captures image data, a light-emitting portion of the light-emitting module is configured to be adjusted in accordance with a location of a user in the image data.

17. The illumination device of claim 10, further comprising:
a gravity sensor configured to detect a gravity direction; and
a processing unit configured to determine the lighting direction falls in the first angular range or the second angular range in accordance with the gravity direction.

18. The illumination device of claim 10, further comprising:
a first elongated housing, wherein the light-emitting module is disposed on the first elongated housing; and
a second elongated housing, wherein the camera unit is disposed on the second elongated housing, wherein the rotation mechanism is disposed between the first elongated housing and the second elongated housing, wherein the first elongated housing and the second elongated housing are coaxial to rotate about the axis.

19. The illumination device of claim 18, wherein the first clip has a first clamping portion and a connecting portion connected to the second elongated housing, and
wherein the second clip has a second clamping portion and a counterweight disposed on the second clamping portion, wherein the first clamping portion and the second clamping portion are moveably connected to each other, and wherein the first clamping portion is in contact with the first side and the second clamping portion is in contact with the second side when the illumination device is disposed over the object.

* * * * *